(12) United States Patent
Adams et al.

(10) Patent No.: US 7,389,256 B1
(45) Date of Patent: Jun. 17, 2008

(54) NETWORK BASED FINANCIAL TRANSACTION PROCESSING SYSTEM

(75) Inventors: Lloyd A. Adams, Houston, TX (US); Hani Yakan, Houston, TX (US)

(73) Assignee: JPMorgan Chase Bank, N.A., New York, NY (US)

( * ) Notice: Subject to any disclaimer, the term of this patent is extended or adjusted under 35 U.S.C. 154(b) by 1475 days.

(21) Appl. No.: 09/366,135

(22) Filed: Aug. 2, 1999

(51) Int. Cl.
*G06Q 40/00* (2006.01)

(52) U.S. Cl. ............................ 705/35; 705/27; 705/26; 705/40

(58) Field of Classification Search ................. 380/24; 707/102; 709/250; 705/42, 35, 27, 26, 40
See application file for complete search history.

(56) References Cited

U.S. PATENT DOCUMENTS

| | | | |
|---|---|---|---|
| 4,727,243 A | | 2/1988 | Savar |
| 4,774,664 A | * | 9/1988 | Campbell et al. ............. 700/90 |
| 5,848,400 A | | 12/1998 | Chang |
| 5,850,446 A | * | 12/1998 | Berger et al. ................. 380/59 |
| 5,878,141 A | | 3/1999 | Daly et al. |
| 5,920,848 A | * | 7/1999 | Schutzer et al. .............. 705/33 |
| 5,931,917 A | * | 8/1999 | Nguyen et al. ............. 709/203 |

FOREIGN PATENT DOCUMENTS

| WO | 93/02424 | 2/1993 |
|---|---|---|
| WO | 95/31789 | 11/1995 |
| WO | 00/28453 | 5/2000 |

OTHER PUBLICATIONS

Hollander, Dema & Cherrington; Accounting, Information Technology and Business Solutions; 1996, Irwin/McGraw-Hill, 2nd Ed.; pp. 269-288, 391-411, 415-430, 508-510.*
Hollander, Dema & Cherrington; Accounting, Information Technology and Business Solutions; 1996, Irwin/McGraw-Hill, 2nd Ed.; pp. 269-288, 391-411, 415-430, 508-510.*
Joel G. Siegel, PhD, CPA, Jae K. Shim, PhD, Dictionary of Accounting Terms, 1995, Barron's, 2nd Ed, p. 123.*
Patel, Jeetu; Andrews, Linda; Gallagher, Sean; Payment by Electrons; Jul. 27, 1998; Information Week; pp. 69-70+.*
First Union to Host Internet Billing Services With Sun-Netscape Alliance's New Spectrum-Compatible iPlanet™ BillerXpert Solution; Dec. 6, 1999; Newswire, p. 5599.*

* cited by examiner

*Primary Examiner*—Alexander Kalinowski
*Assistant Examiner*—Siegfried E. Chencinski
(74) *Attorney, Agent, or Firm*—Goodwin Procter LLP

(57) ABSTRACT

A system and method for processing financial payments including a user terminal, an account processor, and a processing server. The processing server receives financial transaction data from the user terminal and communicates with the account processor, the financial transaction data comprising an amount and an account number. The processing server determines which of the account processors corresponds to the financial transaction data and transmits at least part of the financial transaction data to the determined account processor.

89 Claims, 9 Drawing Sheets

58

| | |
|---|---|
| RECORD TYPE = 2 | 62 |
| ACCOUNT CONTROL DATA | 76 |
| PAYMENT SYSTEM ACCOUNT NUMBER | 78 |
| PAYMENT SYSTEM IDENTIFIER | 80 |
| DATE | 82 |
| AMOUNT | 84 |
| OPERATOR IDENTIFICATION CODE | 86 |
| DEPOSIT ACCOUNT NUMBER | 88 |
| TRANSIT ROUTING NUMBER | 90 |
| GENERAL LEDGER ACCOUNT | 92 |
| DEBIT/CREDIT CODE | 94 |
| COST CENTER | 96 |
| FIXED LENGTH RECORD FILLER | 70 |

FIG. 9

NETWORK BASED FINANCIAL TRANSACTION PROCESSING SYSTEM

BACKGROUND OF THE INVENTION

The present invention relates to a system and method for automated financial transaction processing and, more specifically, to a system and method for processing financial transaction data, including payment, refund, and loan funding data, using a standard web browser in which the system automatically updates, from a group of account processors, the account processor associated with a particular account.

Extensive manual effort is often involved to properly locate and apply a payment (or data corresponding to a financial transaction) to an account in the case where a financial or payment processing institution maintains multiple payment or other financial transaction accounting systems, especially loan payment systems. This situation results from debtors who wish to make a payment to their account, but do not have their payment stub, have an incomplete account number, or have only an account number with no other means of identifying which of the payment systems their account is based. These types of payments are referred to herein as miscellaneous payments.

Tellers or other individuals who interact with customer account holders are often too busy and do not have access to the tools necessary to investigate which processing system is associated with the customer's account. In this case, the teller typically sets the payment aside for manual processing by an operator whose responsibility it is to determine which payment system maintains the account associated with the customer's payment. The operator is typically located at a site remote from the teller's branch, and services many groups of miscellaneous payments from a large region.

A typical procedure employed by financial transaction or payment system owners to process miscellaneous payments and financial transactions including loan funding, loan refunds, and other payables will be described with reference to FIG. 1. In order to determine the financial transaction system associated with a particular account, one or more operators 2 must use one or more terminals 4 to log into each account processor 6 and search for a valid account. Account processors 6 are typically mainframe based programs used to track debit and credit transactions such as loan balances, payments thereto and refunds. Once a valid account is located, operator 2 must then process the payment or refund.

To process the payment, operator 2 first applies a credit to the account in the amount of the payment. Operator 2 prepares a magnetic ink character recognition (MICR) encoded proof ticket, and forwards the remittance provided by the customer such as the check or cash substitute payment slip and the proof ticket to the department responsible for ensuring that the loan owner, i.e., bank, receives payment from the customer's checking account (hereinafter "demand deposit account" or "DDA") or credit card account owner.

Once the payment data has been entered into the appropriate account processor 6 and the remittance and proof ticket forwarded to the appropriate department, operator 2 must then access the payment system owner's general ledger 8 and make one or more updating entries. General ledger 8 is typically a computer based program and database used to track corporation-wide accounting activity. General ledger 8 typically resides on a mainframe computer.

This process requires that each operator 2 have knowledge of the back end systems, i.e., account processor 6, and how to access and operate these systems. The above-described process is inefficient, requiring operators 2 to individually access multiple account processors 6, search for a valid account number in that system, individually apply payments to those systems, and subsequently access and update general ledger system 8. This level of activity decreases the quantity of miscellaneous payments which can be processed by operator 2 and leads to payment processing errors.

In addition, terminal 4 is typically a mainframe terminal or a personal computer ("PC") running mainframe emulation software. Depending on the particular networking environment of the processing system owner, terminal 4 can have dedicated access to only one or a subset of the systems. In this case, user 2 must move from terminal 4 to a different terminal 4 in order to determine which system is associated with an account number. In the case where terminal 4 has access to multiple account processors 6, each operator 2 must still separately log into each processor 6 to determine account association. These multiple logins further decrease operator payment processing efficiency.

It is therefore desirable to have a financial transaction processing system which can automatically determine which account processor 6 a particular payment is associated with, automatically update that system and automatically make the proper accounting treatment entries to general ledger 8. It is also desirable to have a financial transaction processing system which does not require that operator 2 have any special knowledge of the underlying account processors 6.

Special data entry application software is often required in the case where terminal 4 is a PC running mainframe emulation software. As a result, technicians are required to visit each terminal 4 to upgrade data entry applications, terminal emulators and keystroke macros. Also, the use of special emulation software requires particularized operator training such that operator 2 must be trained as to the operation of the software in addition to the processing institution's payment processing procedures. This creates significant expense for the system owner and adds to the inefficiency of payment processing.

In an effort to avoid visits by technicians to terminals 4, systems have been developed which push, i.e., roll out, the application software from a central computer to a permanent storage device within terminal 4 when the terminal is turned on or when an operator logs onto the system. Application roll out is typically used to push software updates to terminal 4. This type of roll out, however, is problematic because pushing applications to a terminal is highly error prone and sensitive to the hardware and software configuration of the terminal. As a result, roll outs often fail and a technician is forced to visit the terminal to complete the software installation and resolve any other problems caused by the failed roll out.

It is therefore also desirable to have an interface on terminal 4 for operator 2 which does not require special customized data entry application software or multiple visits by technicians to upgrade this software, and which does not require specialized training to use (other than the actual payment processing procedures).

SUMMARY OF THE INVENTION

The present invention provides a financial transaction processing system which includes a specialized server. The server facilitates financial transaction data entry and verification by the user of a user terminal. The input terminal requires no special software other than standard web browser software, because all specialized software resides on the server and is transmitted to the user terminal by the server. In addition, the server automatically associates an account number for a payment or financial transaction entry with the corresponding payment or account processor. This saves operator time by eliminating the need for an operator to search through multiple payment systems for a valid account.

The present invention can directly update a financial transaction system, including a payment or payables system, or create a single file comprising all verified transaction data and transfer it to an intermediate breakout processor for parsing. The intermediate breakout processor then updates each respective accounting system as needed. Similarly, the present invention can directly update a general ledger or pass general ledger update data to a breakout processor. The present invention can also initiate an electronic funds transfer to receive compensation for a payment from the customer's demand deposit account or to fund loan proceeds into a customer's demand deposit.

The present invention provides a system for processing financial transactions in which there is at least one user terminal, at least one account processor, and a processing server. The processing server receives transaction data from the at least one user terminal and communicates with the at least one account processor, the financial transaction data comprises an amount and an account number. The processing server determines which of the at least one account processors corresponds to the transaction data and transmits at least part of the transaction data to the determined account processor.

The present invention also provides a processing server which communicates with at least one user terminal and at least one account processor across at least one communication network in which the processing server has at least one memory having financial transaction processing software stored therein and at least one central processing unit executing the financial transaction processing software so as to:

receive transaction data from the at least one user terminal;

verify the accuracy of the received transaction data;

determine which of the at least one account processors corresponds to the verified transaction data; and transmit the verified transaction data to said determined account processor.

The present invention further provides a method for processing financial transactions using at least one user terminal coupled to a processing server and at least one account processor coupled to the processing server. In this method, transaction data is received from the at least one user terminal in which the transaction data includes a transaction amount and an account number. The at least one account processor corresponding to the transaction data is determined, and at least part of the payment data is transmitted to the determined account processor.

Additionally, the present invention provides a method for processing financial transactions in which transaction data is entered corresponding to a plurality of transactions. A determination is made as to whether each of the transactions corresponds to at least one account processor. The accuracy of the plurality of entered transactions is verified, and the verified transaction data is transmitted to the determined account processor.

Other features and advantages of the present invention will become apparent from the following description of the invention which refers to the accompanying drawings.

BRIEF DESCRIPTION OF THE DRAWINGS

FIG. 9 shows a detail record as used in the batch file of FIG. 6;

Figure 1:
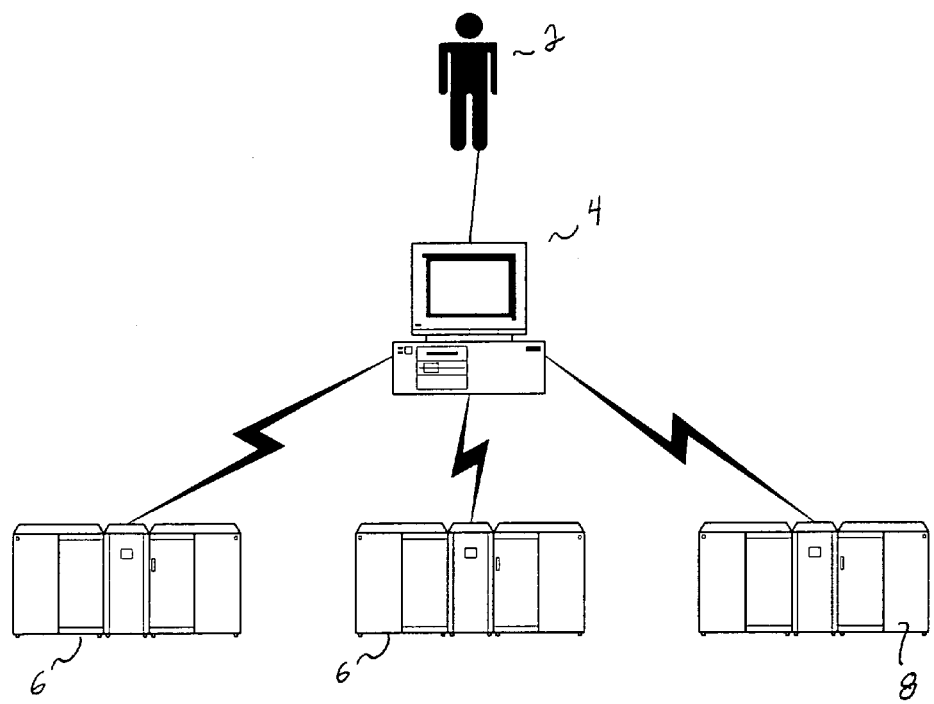
FIG. 1 is a hardware arrangement of a prior art miscellaneous payment system.

For the purpose of illustrating the invention, there is shown in the drawings a form which is presently preferred, it being understood, however, that the invention is not limited to the precise arrangement and instrumentality shown.

DETAILED DESCRIPTION OF THE INVENTION

Initially, it is noted that references to "selecting" or "choosing" refer to the selection by an operator of an object presented on the display of terminal 4.

Figure 2:
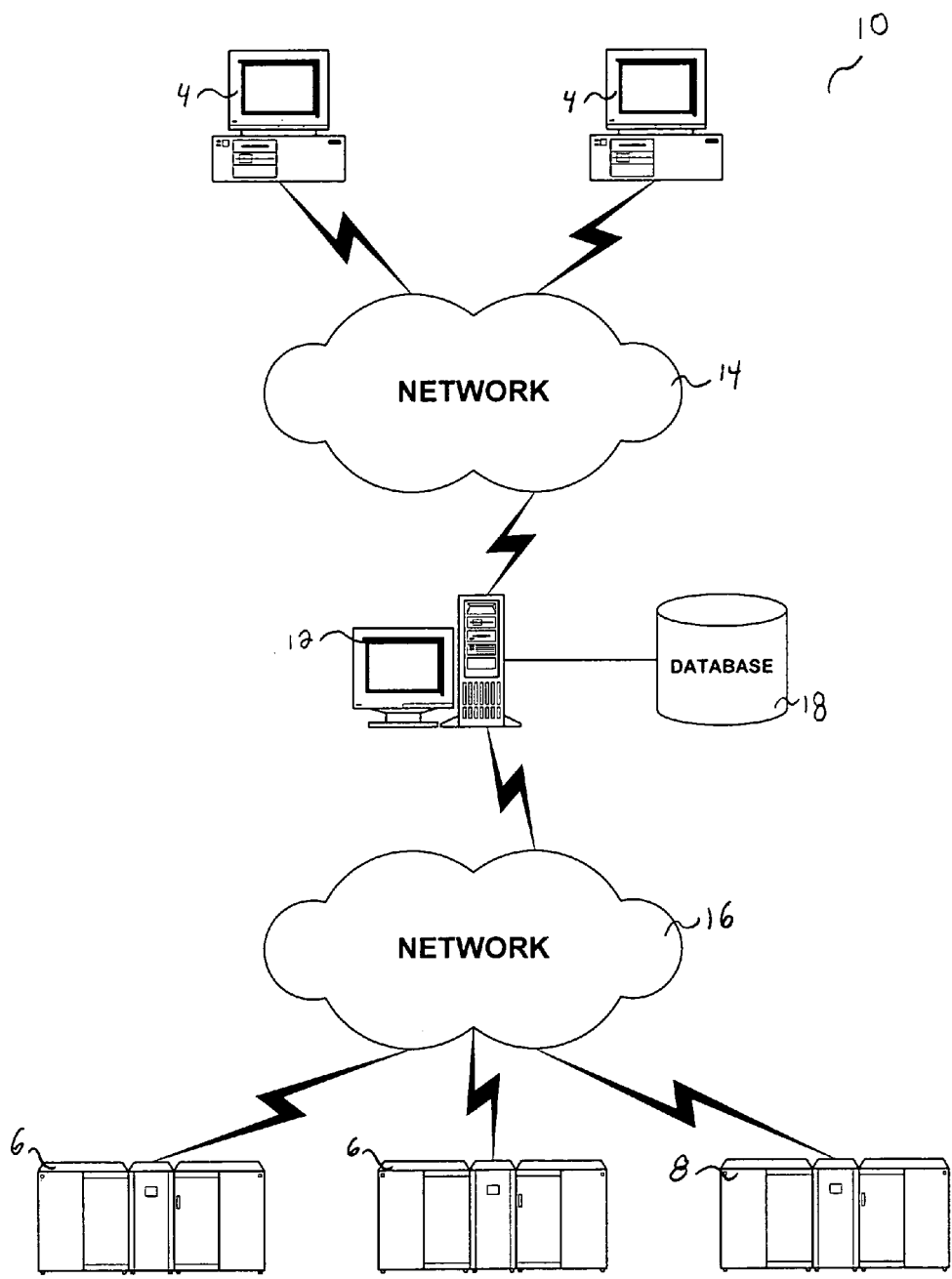
FIG. 2 is a hardware connectivity arrangement of a financial transaction processing system of the present invention.

Referring now to the drawings wherein like numerals indicate like elements, there is shown in FIG. 2 a financial transaction processing system constructed in accordance with the principles of the present invention and designated generally as 10. Financial transaction processing system 10 preferably comprises one or more processing servers 12, one or more terminals 4, one or more account processors 6 and one or more general ledger systems 8.

Terminals 4 and processing server 12 are connected via a terminal communication network 14.

Terminal communication network 14 can be any communication network, whether private or public, but is preferably an intranet to provide corporate-wide access to processing server 12.

Account processors 6 and general ledger system 8 are connected via a mainframe communication network 16. It should be noted that although account processors 6 and general ledger system 8 are typically mainframe computing devices, they are not limited to mainframes. It is contemplated that account processors 6 and general ledger system 8 can execute on smaller computing platforms such as minicomputers, microcomputers and PC servers.

The described connectivity arrangement using terminal communication network 14 and mainframe communication network 16 allows processing server 12 to be easily integrated into existing communication network environments because mainframe based networks are historically separate from PC based local and wide area networks. Of course, account processors 6 and terminals 4 can be connected to, and access processing server 12 through, the same network, i.e., terminal communication network 14.

Database 18, a component of processing server 12, stores, in an organized manner, miscellaneous payment data, funding data, refund data, reports, and other data compilations necessary for the operation of financial transaction processing system 10.

Figure 3:
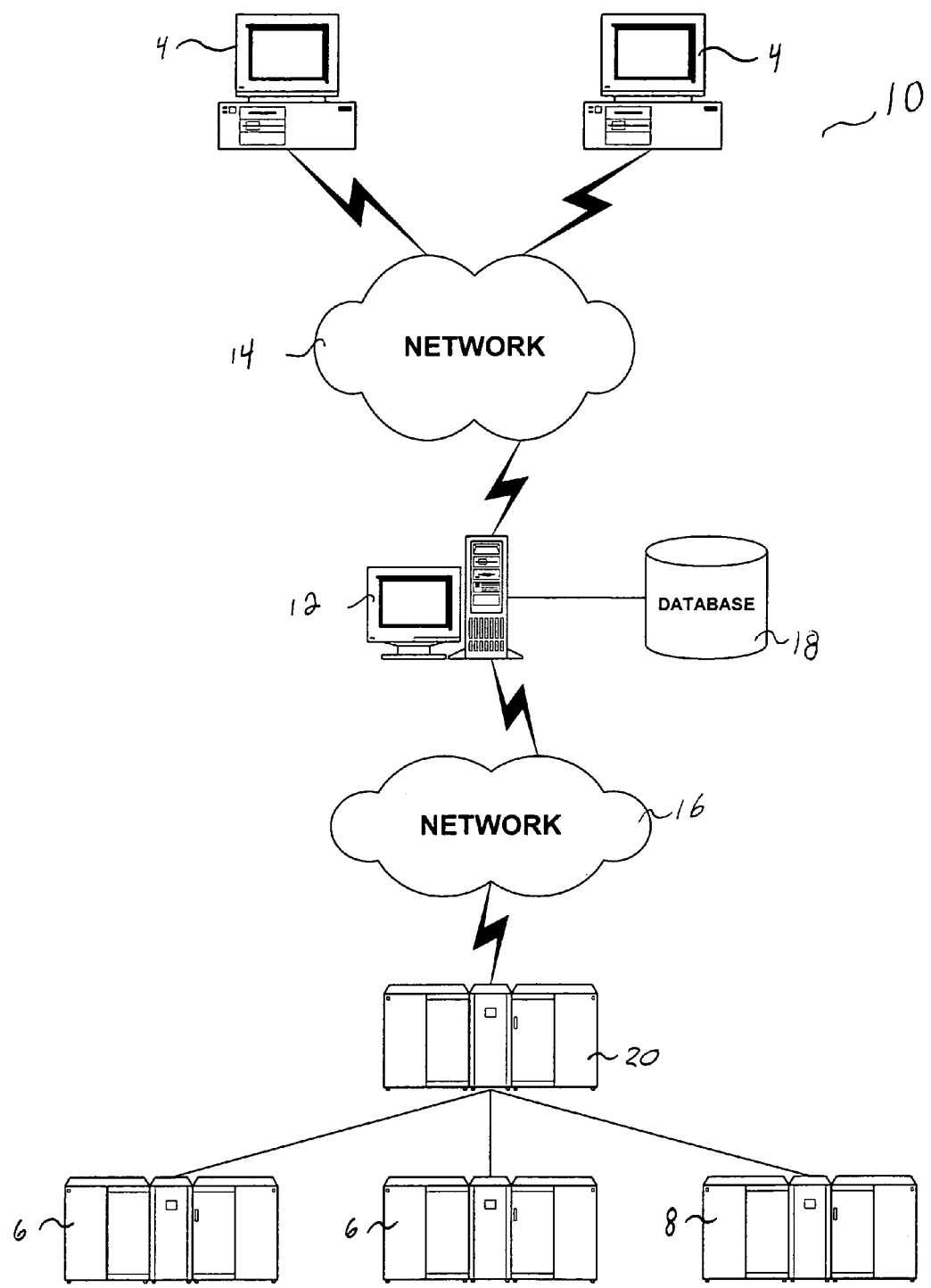
FIG. 3 is an alternative hardware connectivity arrangement for the financial transaction processing system of the present invention.

An alternative hardware connectivity arrangement for financial transaction processing system 10 of the present invention is shown in FIG. 3. In this alternative arrangement, unlike the arrangement described above, processing server 12 does not communicate directly with account processors 6 and general ledger system 8. Instead, processing server 12 communicates with breakout processor 20. Breakout processor 20 in turn communicates with account processors 6 and general ledger system 8. This arrangement allows processing server 12 to create a single file, described below, containing financial data for all account processors 6. Further, the single file is transmitted to breakout processor 20. Breakout processor 20 parses the single file and in turn updates account processors 6 and/or general ledger system 8. Breakout processor 20 can be a mainframe, minicomputer or microcomputer.

A combination of the above described variations is also possible such that processing server 12 directly updates one or more account processors 6 and/or general ledger system 8, while breakout processor 20 updates other account processors 6 and/or general ledger system 8.

Figure 4:
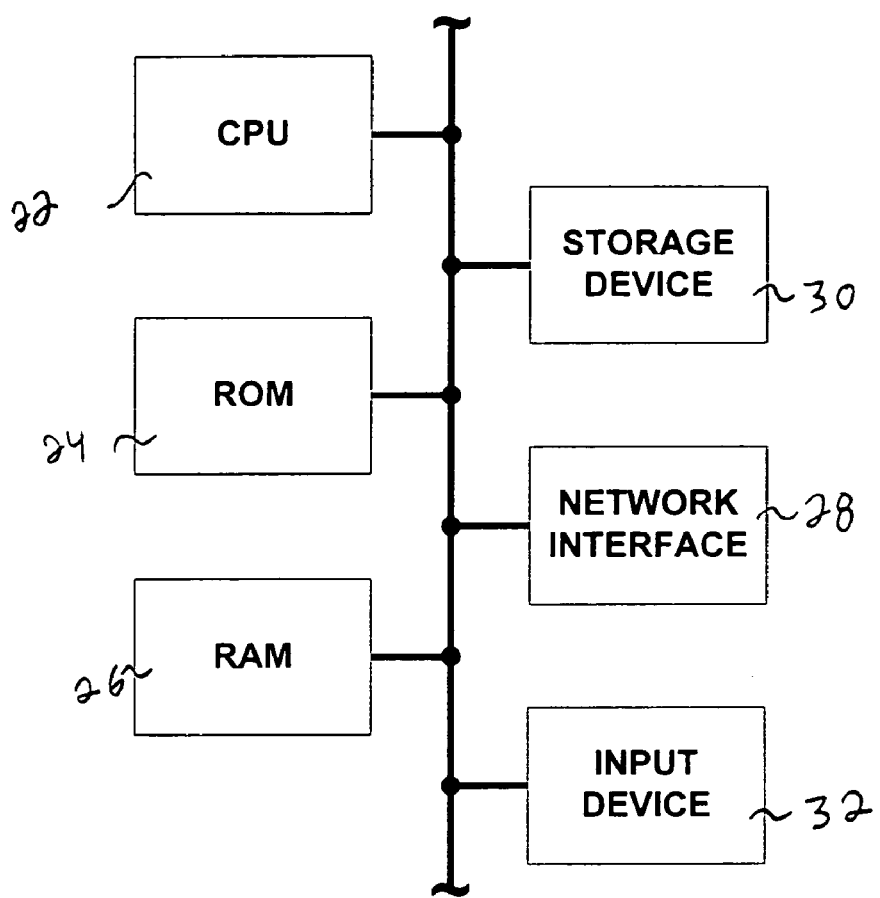
FIG. 4 shows the functional elements of a processing server and terminal according to the present invention.

The software for facilitating communication between terminals 4, processing systems 6 and general ledger 8 resides primarily on processing server 12. As shown in FIG. 4, the functional elements of each processing server 12 preferably include a central processing unit (CPU) 22 used to execute software code in order to control the operation of the server, read only memory (ROM) 24, random access memory (RAM) 26, a network interface 28 to transmit and receive data to and from other computing devices across a network, a storage device 30 such as a hard disk drive, floppy disk drive, tape drive, or CD-ROM for storing program code, database 18 and application data, and one or more input devices 32. Input devices 32 include mice, keyboards, trackballs, pens and other devices suitable for entering data into a computer or selecting portions of a display on a monitor (not shown).

The various components of processing server 12 need not be physically contained within the same chassis or even be located in a single location. For example, storage device 30 may be located at a site which is remote from the remaining elements of server 12, and may even be connected to CPU 22 across terminal communication network 14 via network interface 28.

The functional elements of terminal 4 are the same as those for processing server 12 except that the capacities of the various components may be adjusted to make terminal 4 suitable for a user. By way of example, terminals 4 may be INTEL PENTIUM-based personal computers but are not limited to such computers. Terminal 4 may have less storage capacity and RAM 26 than processing server 12, but may have a larger display and a more sophisticated array of input devices 32. Also terminal 4 and server 12 can run the same or different operating systems including, but not limited to, WINDOWS, UNIX, or MAC-OS.

A significant aspect of the preferred embodiment of the financial transaction processing system is that it does not require that terminals 4 be capable of any functions other than communicating with processing server 12 across terminal communication network 14 and displaying data from, and sending data to, processing server 12 using communication software such as a standard Internet web browser. Instead, all software and data specific to the operation of the financial transaction processing system are stored in processing server 12 itself.

In the preferred embodiment, certain applets such as JAVA applets are stored on processing server 12 and sent to terminal 4 for execution by the web browser software. In this manner, components of financial transaction processing system 10 which require execution on terminal 4 are stored on server 12. The web browser interface on terminal 4 can, therefore, be customized by a JAVA applet sent from processing server 12 to terminal 4. This allows upgrades and enhancements to these components to be easily distributed and tracked, and avoids the need to have a technician travel to the location of all terminals 4 for software upgrades.

The nature of the invention is such that one skilled in the art of writing computer executable code (software), will be able to implement the described functions using a popular computer programming language such as 'C++', JAVA, or HTML. As used herein, references to displaying data on terminal 4 refer to the process of communicating data to the terminal across a network, and processing the data such that the data can be viewed on the terminal's screen using an Internet web browser or the like.

Financial transaction processing system 10 will now be described in detail. It should be noted that although financial transaction processing system 10 is described and operational examples provided with reference to a system which processes payments such as loan and bill payments, the present invention is not limited to this use. The present invention can be used for any type of miscellaneous transactions, for example, a miscellaneous accounting journal entry system which accepts miscellaneous journal entries, verifies the existence of a valid account numbers and updates one or more appropriate account processors.

Also, references herein to "payment" refer to a particular type of financial transaction. More generally, however, it is contemplated that the present invention can process any miscellaneous financial transactions existing in the form of debits and credits, for example, refunds and loan funding transactions.

In the payment system example described herein, processing server 12 is a payment processing server, and account processors 6 are payment systems. The payment systems track account balances and payments thereto. However, it is contemplated that account processors 6 can also be accounts payable processors, check writing systems for printing and accounting for loan for checks such as loan funding checks, or a combination thereof.

Figure 5:
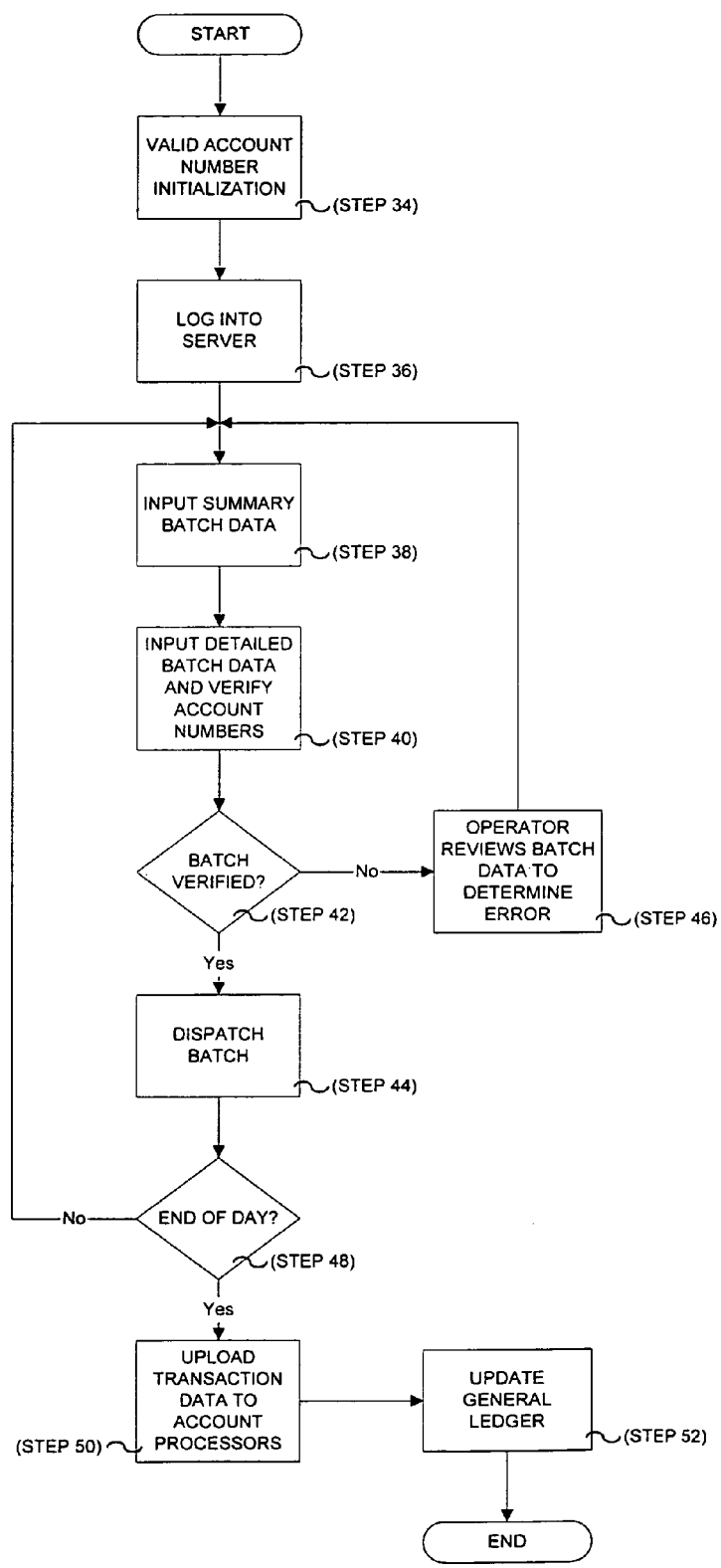
FIG. 5 is a flowchart showing the process flow of a financial transaction using the present invention.

FIG. 5 is a flow chart of the financial transaction processing system of the present invention. Processing server 12 must first be initialized such that it is able to identify valid account numbers in order to associate those numbers with the proper account processor 6 (step 34).

There are two preferred methods for initializing processing server 12 with valid account number and account processor 6 associations. First, processing server 12 can download valid account numbers from each account processor 6 during the initialization phase. The valid account numbers associated with each account processor 6 can then be stored in storage device 30 or RAM 26 for future reference. Second, known algorithms can be employed using programmatic code in processing server 12 to determine which account processor 6 is associated with a group of account numbers. For example, accounts associated with a particular system may possess a common range of account numbers, digit quantity and/or a digit located at a particular position.

Once processing server 12 has been initialized and account numbers downloaded or algorithms for determining account numbers and associated systems established, the system is ready for use. All operators 2 and supervisors must log into processing server 12 using a predetermined user ID and password for identification prior to using the system (step 36). A supervisor is a system user with a higher level of operating privilege than an operator 2 such that a user with supervisory authority can initiate system actions for which a normal operator does not have permission. In addition, financial transaction processing system 10 supports multiple levels of supervisory authority in which supervisors themselves can have varying degrees of authority. Software and methods for authenticating system users and establishing multiple levels of operating privileges are known to those of ordinary skill in the art.

An operator 2 is typically presented with a group of miscellaneous payments to process. This group of payments is referred to as a "batch". This batch can either be grouped by operator 2, the operator's supervisor, or another individual responsible for preparing payments for processing. There is no particular payment quantity required to form a batch although 25-50 payments are preferred.

Once logged in, operator 2 uses the web browser interface on terminal 4 to input the amount of each payment in the batch to create a total amount (sum) and quantity of the payments for that batch (step 38). An example of an input amount web browser screen, and the functionality of processing server 12 regarding this display screen are described in detail below.

Once the summary data has been entered for the batch, operator 2 inputs detailed data for each payment in the batch using the web browser interface on terminal 4 (step 40). Payment information includes the account number, which is validated by processing server 6 as being a valid account number, the effective date of payment, the amount of the payment, the payment type, i.e. regular payment, interest only, etc., and the reasons for making the payment, such as that the payment is due. This detailed information is stored in database 18 for each payment. It is contemplated that a single payment instrument, i.e., check, can be used to apply a payment to multiple accounts.

Because account numbers are verified by processing server and associated with an account processor 6 as the detailed transaction data is entered, operator 2 is able to quickly enter this detailed information without the need to stop and determine which account processor 6 is associated with that account. Processing server 12 makes this determination based on the account number for the payment, and stores the payment system identification along with the particular payment record data in database 18. Step 40 is discussed in detail below.

Once detailed payment information has been entered for each payment in the batch, the operator causes payment system 12 to verify that the batch has been properly entered (step 42). In batch verification step 42, processing server 12 totals the payment amount and quantity for all detailed payments entered in step 40, and compares those totals with the summary batch data determined as a result of summary batch data entry in step 38. If the payment totals and payment quantities match, the batch is considered verified and proceeds to the batch dispatch step (step 44). Preferably, if the batch is complete and contains valid account numbers and amounts, the batch is dispatched automatically.

If the payment totals or payment quantities between the summary and detailed data do not match, the batch is not verified. In the case where a batch is not verified, the operator must review batch data in an attempt to determine the error (step 46). The review undertaken by operator 2 can include reviewing the detailed batch data to determine if a data entry error was made, a payment omitted, etc. Operator 2 can also re-input summary batch data in step 38, or optionally can re-enter detailed payment data for some or all of the entire batch in step 40.

In the case where operator 2 cannot determine where the error is, operator 2 can preserve the batch for review by a supervisor. Although operator 2 cannot cause an unverified batch to be dispatched in step 44, a supervisor can override batch verification step 42 and cause an unverified batch to be dispatched for subsequent processing.

Once a batch has been verified in step 42, the batch is dispatched for subsequent processing by processing server 12 and account processors 6. Batch dispatching can be automatic such that an operator need not take any affirmative action to dispatch the batch, or can be manual such that the operator must select a particular icon displayed on terminal 4 to affect the dispatch.

The dispatch function is described as follows. Once a batch has been verified, or a supervisor has overridden the verification step, processing server 12 causes a proof ticket to be printed on a printer (not shown), preferably near operator 2. The proof ticket is a MICR-encoded document which accompanies the remittances associated with a batch. The remittances and proof ticket typically go to a department whose responsibility it is to process the remittances so that the lending institution can receive compensation from the institution upon which the remittance is drawn. The proof ticket typically comprises an operator identification code to associate the batch with the processing operator 2, a unique batch identification number, the total monetary amount of the remittances, and the quantity of remittances in the batch.

In addition, a dispatched batch is stored in database 18 with a flag indicating that the batch has been verified and data corresponding to each miscellaneous payment in the batch is ready to be transmitted to the appropriate account processor 6. Often, a verified batch will be stored in database 18 in a special file which cannot ordinarily be accessed prior to its transmission to payment systems across mainframe communication network 16. This ensures the integrity of the data and of the ensuing upload.

The process of entering batches, verifying batches and dispatching batches continues throughout the business work day. At the end of the business day, or at any other predetermined time (step 48), dispatched batch transaction data is uploaded to the appropriate account processor 6 (step 50).

Processing server 12 can sort the dispatched payments for each account processor 6, and transmit a file containing miscellaneous payment data to each system using known file transfer techniques such as File Transfer Protocol (FTP) via a Transmission Control Protocol/Internet Protocol (TCP/IP) connection session.

Finally, processing server 12 updates general ledger 8 (step 52) by making accounting entries corresponding to the payments in all of the dispatched batches. Data used to update general ledger 8 preferably includes general ledger account numbers, debit or credit codes, i.e. whether the indicated amount is a debit or credit to the general ledger account, and a cost center identification number corresponding, for example, to a particular business unit. All of this general ledger information can be associated with a particular account number, and/or account processor 6 and can be downloaded from account processor 6 and/or general ledger 8 during the initialization stage of processing server 12.

The case in which the payment data upload of step 50 is implemented in the alternative hardware configuration using breakout processor 20 as shown in FIG. 3 will now be described. Where financial transaction processing system 10 employs the use of a breakout processor to parse and distribute account payment data to the respective account processors 6 and/or general ledger 8, processing server 12 can maintain a single file stored in storage device 30 or RAM 26 in which each individually dispatched batch is appended thereto. Thus, at the end of the day, processing server 12 need only transmit the single compilation file to breakout processor 20 via mainframe communication network 16.

As in the case where processing server 12 is transferring individual files directly to the respective account processors 6, any suitable technique for file transfer can be used.

Figure 6:
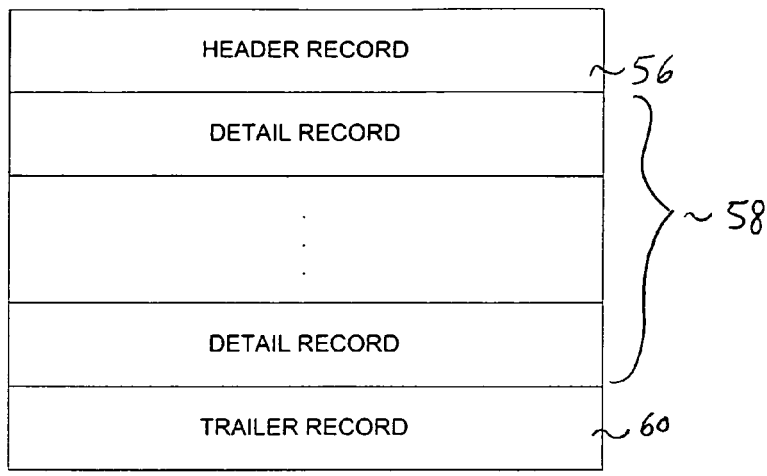
FIG. 6 shows an arrangement for each batch file created and stored by a processing server according to the present invention.

FIGS. 6-9 show a preferred arrangement of the records stored in database 18 in storage device 30 or RAM 26 in the case of the financial transaction processing system shown in FIG. 3. It should be noted that although the described records correspond to a payment based system, these records can easily be used in a more general debit/credit based financial transaction processing system. Recall that in the arrangement shown in FIG. 3, the file transferred from processing server 12 to breakout processor 20 at the end of the day is a compilation of appended dispatched batches. FIG. 6 shows the preferred arrangement for each batch file as batch file layout 54. Each batch file layout 54 is comprised of a header record 56, one or more detail records 58 and a trailer record 60. The header record establishes the beginning of the detail corresponding to a batch, detail record 58 contains data corresponding to a miscellaneous payment, and trailer record 60 contains batch verification data, each of which is discussed below. Therefore, the file transferred to breakout processor 20 is comprised of one or more batch file layouts 54.

Figure 7:
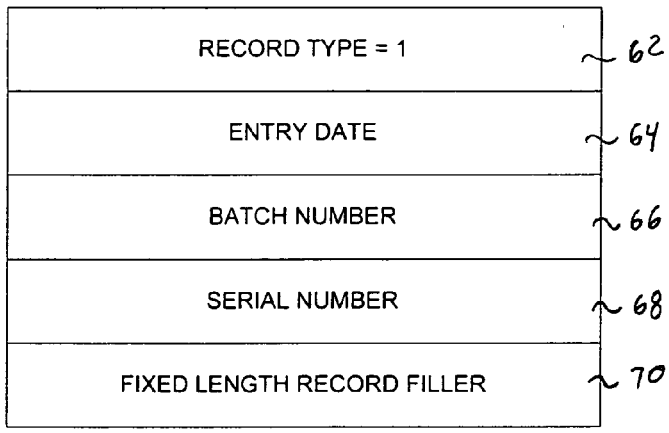
FIG. 7 shows an arrangement for a header record as used in the batch file of FIG. 6.

FIG. 7 shows a preferred arrangement for a header record 56. Header record 56 is arranged to include a record type identifier field 62, entry date record field 64, batch number field 66, serial number field 68 and optionally, fixed length record filler 70. Record type identifier field 62 is used to identify whether the record is a header record 56, a detail record 58 or a trailer record 60. In the case where the record is a header record 56, the record type identifier field 62 is set to "1". Similarly, a detail record 58 corresponds with record type identifier field 62 equal to "2", and a trailer record 60 corresponds to record type identifier field 62 equal to "3".

Entry date field 64 corresponds to the date that the batch was entered. In the case where the batch entry spanned multiple days, entry date field 64 corresponds with the date the batch was created. However, entry date field 64 can also be set to correspond with the date the batch was dispatched. Batch number field 66 is a unique number identifying the detail records associated with the batch, and is established at the time the batch is created. The batch number is created by, and stored in, processing server 12. Serial number field 68 is a unique identification number assigned to each processing server 12. Serial number 68 is therefore especially useful in the case where financial transaction processing system 10 is comprised of multiple processing servers 12. Serial number 68 enables the particular processing server 12 sending batch data to be identified in the future.

Finally, an optional fixed length record filler 70 can be filled with null data such as spaces to create a fixed length record. Fixed length record filler 70 is necessary in cases where account processors 6 require fixed record lengths, and the total length of the fields in each record comprise fewer characters than the required fixed record length. It should be noted that fixed length record filler 70 can be of varying lengths depending on whether the record is a header record 56, detail record 58 or trailer record 60. This is the case because the overall length of a header record 56 might be smaller than the overall record size of a detail record 58 such that different amounts of filler are required to create a uniform record length size.

Figure 8:
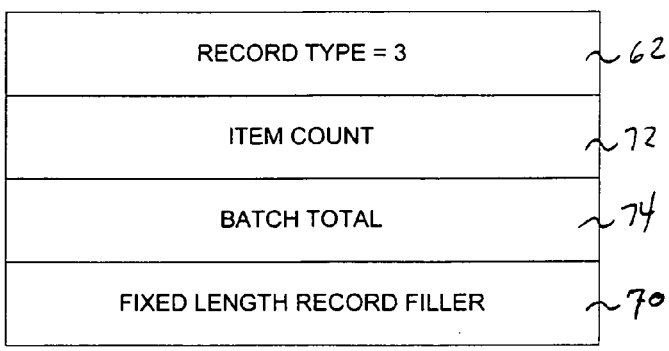
FIG. 8 shows an arrangement for a trailer record as used in the batch file of FIG. 6.

FIG. 8 shows an example arrangement of a trailer record 60 of the present invention. Trailer record 60 is comprised of a record type identifier field 62, item count field 72, batch total field 74 and fixed length record filler 70. As discussed, record type identifier field 62 is set to "3" identifying the record as a trailer record. Item count field 72 corresponds to the total quantity of items in the batch. Each item has an associated detailed record 58. Batch total field 74 corresponds to the monetary sum of the payments in the batch. Finally, fixed length record filler 70 is an optional field used, where necessary, to create a fixed length record.

FIG. 9 shows an example of a preferred detail record 58 as used according to the present invention. Detail record 58 is comprised of record type identifier field 62, account control data field 76, payment system account number field 78, payment system identifier field 80, date of payment field 82, amount field 84, operator identification code field 86, deposit account number field 88, transit routing number field 90, general ledger account field 92, debit/credit field 94, cost center field 96, and an optional fixed length record filler 70.

Record type identifier field 62 is set to "2" to identify the record as a detail record 58. Account control data field 76 is used to provide a further breakdown of the account in the case where a account processor 6 is comprised of more than one physical or logical processor. In other words, account control data field 76 allows for regional or product sub-grouping of accounts within one account processor 6.

Payment system account number field 78 corresponds to the customer's account number on the particular account processor 6. Payment system identifier field 80 is used to identify which account processor 6 is associated with the customer's account identified by payment system account number field 78. Payment system identifier 80, as discussed above, is automatically determined by processing server 12 based on the customer's account number.

Date field 82 corresponds with the date of the miscellaneous payment, and amount field 84 corresponds to the amount of the miscellaneous payment. Operator identification code field 86 corresponds to the identification number or serial number of the operator 2 who entered the miscellaneous payment into processing server 12 via terminal 4.

Deposit account number field 88 corresponds to the customer's DDA number or other account which will be debited or credited in the amount of the customer's payment or refund in amount field 84. In other words, deposit account number field 88 is used for electronically transferring funds to and from a customer's checking, saving or other credit account to make a payment, deposit a refund or original loan proceeds funding.

Transit routing number field 90 corresponds to the identification number of the financial institution which maintains the deposit account indicated in deposit account number field 88. Thus, as is typical in the art, deposit account number field 88 and transit routing number field 90 represent the complete information necessary to execute an electronic funds transfer (EFT) to/from a customer's DDA. It should be recognized that the EFT data comprised of deposit account number field 88 and transit routing number field 90 are optional, and are not integral to the operation, performance, or function of financial transaction processing system 10.

According to the present invention, financial transaction processing system 10 can directly or indirectly, i.e., through a clearing house, communicate with the customer's DDA holder to arrange an EFT payment or deposit transaction. In particular, processing server 12 can establish a communication session with a computer at the customer's DDA institution, or can communicate DDA data to breakout processor 20 as described above. In the latter case, breakout processor 20 will directly or indirectly initiate the EFT transaction.

General ledger account field 92, debit/credit code field 94 and cost center field 96 comprise the fields necessary to update general ledger 8. In particular, general ledger account field 92 identifies the particular account code number corresponding to the customer's miscellaneous payment (or financial transaction). Debit/credit code field 94 indicates whether the payment amount in amount field 84 is a debit or credit to the general ledger account number in general ledger account field 92. Finally, cost center field 96 corresponds to a code which identifies a particular business unit associated with the entry in general ledger account field 92. Fixed length record filler 70 completes detail account record 58.

It should be recognized that the fields and the arrangement of fields within each record can be tailored to the particular design of each financial transaction processing system 10. For example, a financial transaction processing system 10 which does not update general ledger 8 would not need general ledger account field 92, debit/credit code field 94 or cost center field 96 as part of detail record 58. Similarly, the arrangement of each field within a record can be adjusted to suit a particular implementation of financial transaction processing system 10.

As another example, detail record 58 shown in FIG. 9 contains payment system identifier field 80. This field may not be necessary in the case where processing server 12 is directly updating account processor 6 without using breakout processor 20. Similarly, in the case where processing server 12 directly updates general ledger 8, detail record field 58 may comprise only those fields which are necessary for the updating of the general ledger, for example, date field 82, amount field 84, general ledger account field 92, debit/credit code field 94 and cost center 96. In the case of a direct update of account processor 6, header record 56 and trailer record 60 might be adjusted to correspond to the quantity and total of only those detail records in a batch associated with that particular account processor 6.

Figure 10:
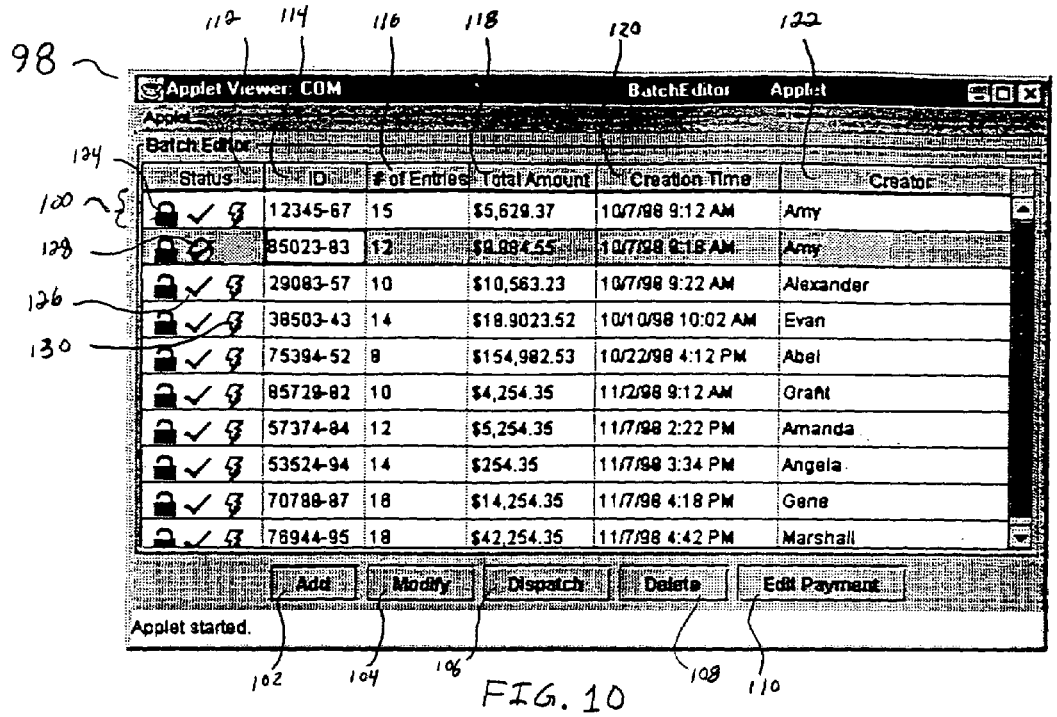
FIG. 10 is an example display of summary information presented on a user terminal.
Figure 11:
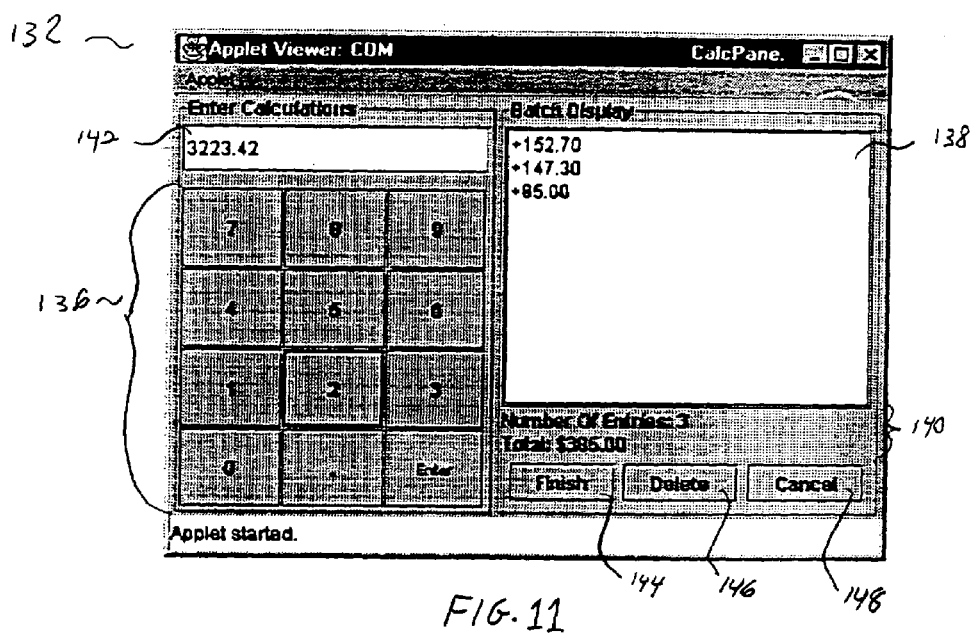
FIG. 11 is an example display presented on a user terminal used to input summary batch data.
Figure 12:
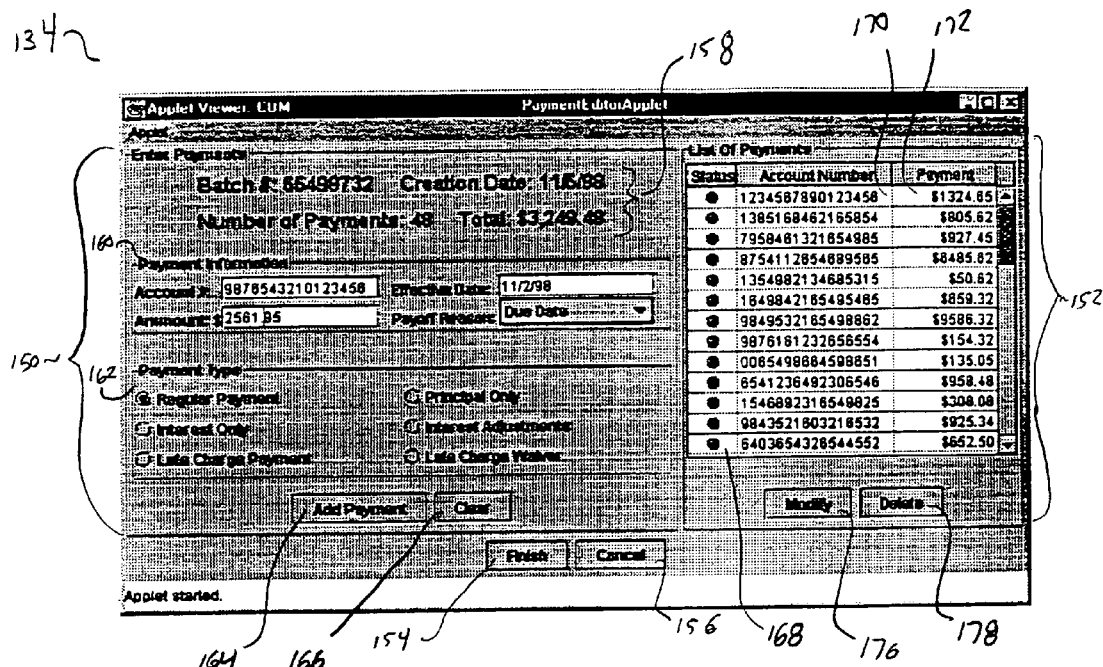
FIG. 12 is a display presented on a user terminal used to input detailed information for each payment in a batch.

The entry and verification of batch data in steps 38 and 40 will now be described with reference to a payment based financial transaction processing system as shown in FIGS. 10-12 in which FIG. 10 shows a display of summary information for all pending batches, FIG. 11 shows a display used to input summary batch data, and FIG. 12 shows a display used to input detailed payment information for each payment in a batch.

FIG. 10 shows an example of batch editor display 98, presented to operator 2 on terminal 4. Batch editor display 98 appears once operator 2 has successfully been authenticated by processing server 12. As with all payment processing display screens in the present invention, the data necessary to create the display, as well as the record data filling in the rows and columns of batch editor display 98, are transmitted by processing server 12 and are stored therein.

Batch editor display 98 is comprised of batch summary rows 100, and add batch button 102, modify batch button 104, display batch button 106, delete batch button 108 and edit payment button 110. Each batch summary row 100 contains data corresponding to a particular batch and is comprised of status block 112, batch identification block 114, entry quantity block 116, total of payments block 118, batch creation time block 120 and creating operator block 122.

Status block 112 is comprised of three icon areas which, taken together, provide complete status information for the batch. Status information data is received from processing server 12 and displayed on user terminal 4 as a corresponding icon. Lock icon 124 indicates the locked state of the batch. When locked, only the operator 2 (or his or her supervisor) who locked the batch can be editing entries or payments. Processing server 12 will not allow any other operators to access a locked batch. A batch is unlocked when it is not being processed by an operator or supervisor. Locking a batch prevents data corruption resulting from multiple simultaneous access.

Batch completion icon 126 indicates whether batch entry is complete. If the amounts from step 38 (input summary batch data) and the amounts from step 40 (input detailed batch data) balance, i.e., the batch is verified, processing server 12 will automatically set the completion state of the batch to complete, as indicated with batch completion icon 126. In the case where a batch is not yet complete, batch incomplete icon 128 is used.

The third icon area in status block 112 is batch dispatch icon 130. When present, batch dispatch icon 130 indicates that a batch has been completed and has been dispatched for end of the day processing.

Identification block 114 contains a unique number associated with the batch, automatically generated by processing server 12 at the time the batch is created. The entry in batch identification block 114 corresponds to batch number 66 in header record 56.

Entry quantity block 116 contains the quantity of payments in the batch. Once complete and dispatched, the entry in entry quantity block 116 corresponds to item count field 72 in trailer record 60, and corresponds to the quantity of detail records 58 for the batch.

Total amount block 118 contains an entry corresponding to the sum total of all payments in the batch, and corresponds to batch total field 74 in trailer record 60. Creation time block 120 contains the date, and optionally time, that the batch was created, and corresponds to entry date field 64 in header record 56. Creating operator block 122 contains the name of the operator 2 who created the batch. Processing server 12 maintains a list of authorized operators 2 by name and a corresponding identification code. The operator identification code associated with the operator identified in creating operator block 122 is implemented in operator identification code field 86.

FIG. 10 also shows a series of buttons present in batch editor display 98 which, when selected by operator 2, initiate certain functions on processing server 12.

Selecting add batch button 102 causes processing server 12 to create new records in database 18 for a new batch. In this case, processing server 12 will automatically generate a batch identification number for the batch, and indicate its presence on batch editor display 98. In addition, adding a batch causes calculator display 132, shown in FIG. 11, to be displayed on terminal 4. As discussed below, calculator display 132 is used to enter monetary payment amount data for the payments in the batch.

Selecting modify existing batch button 104 causes calculator display 132 to be displayed on terminal 4 for an existing batch. In the case of modifying, dispatching, deleting, or editing payments within a batch, operator 2 selects which batch he or she wishes to operate on by selecting any block corresponding to the desired batch on batch editor display 98.

Selecting batch dispatch button 106 causes processing server 12 to dispatch the selected batch, as discussed above with respect to step 44. Although a verified batch is preferably automatically dispatched, it is contemplated that a situation might arise in which a batch may need to be dispatched prior to verification. In this case, a supervisor with a higher level of authority than an operator 2 can be authorized to prematurely dispatch unverified batches, but a typical operator 2 would not have authority to dispatch unverified batches. Selecting dispatch batch button 106 has no effect and is ignored by processing server 12 if selected by an unauthorized operator 2.

Similarly, an operator or a supervisor with appropriate authority may wish to delete a batch, whether verified or unverified. In this case, operator 2 or a supervisor would select delete batch button 108 on batch editor display 98. This erases all batch data associated with that batch from database 18.

Finally, operator 2 may wish to begin or continue editing detailed payment data. Selecting edit payment button 110 causes enter payment display 134 to be displayed on terminal 4. Calculator display 132, shown in FIG. 11, and enter payment display 134, shown in FIG. 12, are described in detail below. Thus, batch editor display 98 provides operator 2 or a supervisor with a comprehensive, yet simple, view of each pending batch, and allows operator 2 to quickly add, delete and edit batches.

FIG. 11 shows calculator display 132 used by operator 2 to enter payment amounts for each miscellaneous payment in a batch, corresponding to step 38. Calculator display 132 is comprised of a keypad area for entering numerical quantity data, batch display area 138 showing the entered payments for the batch, summary area 140, showing the total number of entered payments and the total amounts of those payments, and amount entry area 142.

Operator 2 uses keypad 136 to enter payment data by selecting the appropriate key, or can use a keyboard to enter the payment data. As each payment is being entered, the numbers corresponding to that payment appear in amount entry area 142. When a payment has been entered by selecting the enter button on keypad 136 or by any other action which indicates that an entry has been completed, such as depressing the enter key on the keyboard, the amount appearing in amount entry area 142 is transferred to batch display are 138.

Calculator display 132 is also comprised of finish button 144, delete button 146 and cancel button 148. Selecting finish button 144 indicates to processing server 12 that operator 2 is finished entering payments for the batch. Selecting cancel button 148 informs processing server 12 that operator 2 wishes to cancel the proceeding operations and cancel the activity occurring since the time calculator display 132 was presented to operator 2. Preferably, selecting cancel button 148 causes calculator display 132 to be removed from the monitor display on terminal 4, i.e., the window closed.

Operator 2 can highlight a particular payment amount in batch display area 138 by an appropriate method of selection and can cause that particular entry to be deleted by selecting delete button 146.

In sum, calculator display 132 provides operator 2 with a quick and simple way to enter payment amounts for a batch of miscellaneous payments. Operator 2 need only be familiar with the general operating principles of a graphical user interface to make these entries.

FIG. 12 shows enter payment display 134 presented on terminal 4 from which an operator 2 can enter detailed information for each payment in a batch. Enter payment display 134 is comprised of two main areas, namely payment entry area 150 and payment list 152. Enter payment display 134 also includes finish button 154 and cancel button 156. Finish button 154 and cancel button 156 operate analogously to finish button 144 and cancel button 148 in calculator display 132. In other words, selecting finish button 154 or finish button 144 on its respective display causes processing server 12 to store the corresponding data in database 18, and close the open display screen.

The payment entry area 150 provides operator 2 with a simple, yet comprehensive, method in which to enter detailed payment data. Payment entry area 150 is comprised of information area 158, payment data area 160, payment type area 162, add payment button 164 and clear button 166.

Information area 158 presents a user with information about the particular batch being edited, such as the assigned batch number, the creation date of the batch, the number of payments which should be in the batch and the total of those payments as entered in calculator display 132.

Operator 2 enters data corresponding to each payment in payment data area 160 by entering the account number associated with that payment, the effective date of the payment, the amount of the payment, and a reason, if known, for making the payment. Payment reasons include, but are not limited to, that the payment is due, that the customer is making a payment when none is due, i.e., prepayment, that the reason is unknown, etc. Preferably, the payment reason selection defaults to "payment due" where operator 2 makes no entry. Finally, operator 2 selects the appropriate payment type in area 162. Payment types include, but are not limited to, that the payment is a regular payment, an interest only payment, a late charge payment, a principal only payment, an interest adjustment, or a late charge waiver. Of course, payment type items can be customized according to the particular implementation of financial transaction processing system 10.

Upon completion of the data entry for a particular payment, operator 2 selects add payment button 164. Should operator 2 wish to clear payment data area 160 or payment type area 162, operator 2 selects clear button 166.

By selecting add payment button 164, the data corresponding to that payment is recorded by processing server 12, and displayed in payment list 152. In particular, payment list 152 is comprised of payment status block 168, account number area 170, and payment area 172. Account number area 170 and payment area 172 correspond to the information added in payment data entry area 160.

Status block 168 indicates the validity of an entered payment. A payment is considered valid if its account number, as shown in account number area 170, matches an account number stored in processing server 12 or can be derived using an algorithm as described above, and contains a payment amount, appearing in payment area 172, which matches a payment amount entered in calculator display 132 (summary data entry). A valid entry is indicated by a green status symbol, and an invalid entry is indicated by a red status symbol. Of course, any two different symbols, such as a circle and a square, can be used to indicate valid and invalid statuses. In the alternative, an entire entry in payment list 152 comprising account number area 170 and corresponding payment area 172 can be displayed in one color to indicate a valid entry, and displayed in a different color to indicate an invalid entry. Invalid entries can be selected and modified or deleted by operator 2 (or a supervisor) as appropriate. The invalid, i.e., unverified miscellaneous payments are not processed by operator 2 and are sent to a different group for detailed investigation.

Operator 2 can modify or delete an entered payment by selecting the payment in payment list 152 and then making an appropriate selection between modify payment button 176 and delete payment button 178.

Each of batch editor display 98, calculator display 132 and enter payment display 134 are preferably implemented in a graphical user interface environment within a web browser such that terminal 4 employs the use of known windowing techniques, such as scroll bars, window maximizing and minimizing functions, etc.

Thus, entering data for a payment requires little more than entering account number, the amount, the date of payment and selecting the appropriate payment type. Operator 2 need not be concerned with which account processor 6 is associated with a particular account number because, as discussed above, processing server 12 automatically makes the proper association with a processing system 6.

Processing servers 12 also contain functionality to search through database 12 to provide reports to interested users. For example, processing server 12 can generate batch summary reports, reports indicating where supervisors overrode entered data or dispatched unverified batches, reports indicating the number of loans paid off, or details regarding dispatched batches. Of course, processing server 12 can be configured using known programming techniques to generate any report of interest for which the data is available in database 18.

Financial transaction processing system 10 can prepare balancing reports to reconcile that the transaction data sent by processing server 10 to account processors 6 (directly or via breakout processor 20) was received by account processors 6. Processing server 12 maintains a record of financial transaction data sent to each payment system. Similarly, each account processor 6 maintains a record of transaction data received from processing server 12. Processing server 12 can transmit its records to a designated account processor 6, account processor 6 can transmit their records to processing server 12, or preferably, processing server 12 and account processors 6 each transmit their respective records to a separate report generation computer (not shown).

For example, if processing server 12 updates three account processors 6 during the end of day data payment upload (step 50), the report generation computer will receive data from processing server 12 and each of the three payment systems and prepare one or more appropriate reports, including balancing reports. Balancing reports can be general, for example, showing a summary of payments sent to a account processor 6 and sent by processing server 12, or detailed, for example, a report showing each payment sent and received.

Processing server 12 is therefore responsible for session management between the server and terminal 4, batch processing and entry, sorting, parsing and compiling data and sending that data to account processors 6 and general ledger 8, and generating reports.

In sum, processing server 12 enables operator 2 to use terminal 4 in a manner such that batches can be quickly created, verified and dispatched, and the payment data corresponding to each batch can be easily entered and edited. The present invention employs the use of three main display screens to perform these functions. Additionally, processing server 12 provides the point of interface to account processor 6 and general ledger 8 such that operator 2, a supervisor or any other user does not directly interact with account processor 6 or general ledger 8. The tasks of sorting, parsing and uploading data to the individual payment systems is handled by processing server 12.

The combination of processing server 12 with the rest of the components in financial transaction processing system 10 creates a powerful system for handling large volumes of miscellaneous transactions, such as payments, in an environment comprising many different payment systems. In other words, the present invention allows a financial institution or other institution requiring this type of system to operate at a very large scale. The present invention is particularly suited to loan payment systems, but is equally implementable in any environment in which an institution receives payments or processes debit and credit based transactions. The present invention may also be used to create funding transactions for disbursing loan proceeds or refunds to customers via communication with a payable system or a check writing system, or by using electronic funds transfer. For example, an institution which processes bills and refunds for a number of different companies would find this system particularly useful, because that institution would use financial transaction processing system 10 to apply payments received from the companies' customers, even where the customer failed to return the invoice, or where the invoice is illegible for some reason.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A system for processing financial transactions, said system comprising:
   a plurality of financial transaction accounting systems;
   a parsing processing server;
   a user terminal permitting an operator to enter a group of transaction data sets into said parsing processing server, each transaction data set comprising an amount and an account number and being associated with a respective one of said financial transaction accounting systems, at least two of said transaction data sets in said group being associated with a different said financial transaction accounting system;
   said parsing processing server receiving said group of transaction data sets, determining if said group was correctly entered and, if so, sending each transaction data set in said bundle to that said financial transaction accounting system with which it is associated.

2. The system according to claim 1, wherein said parsing processing server receives said transaction data sets from said user terminal across a first communication network and communicates with said financial transaction accounting system across a second network.

3. The system according to claim 1, wherein said parsing processing server receives said group of transaction data sets from said user terminal and communicates with said financial transaction accounting system via the same communication network.

4. The system according to claim 1, further comprising a general ledger system communicating with said parsing processing server.

5. The system according to claim 4, wherein said parsing processing server transmits accounting update data to said general ledger system, said accounting update data corresponding to at least a portion of said transaction data sets.

6. The system according to claim 1, wherein said user terminal comprises web browsing software such that, in the absence of any specific financial transaction processing software installed thereon and in accordance with programmatic instructions received by said user terminal from said parsing processing server, said user terminal:
   allows a user of said user terminal to enter said transaction data sets;
   allows a user of said user terminal to enter manually totaled information concerning the group of transaction data sets; and
   transmits said group of transaction data sets and said manually totaled information to said parsing processing server.

7. The system according to claim 6, wherein said parsing processing server determines if said group was correctly entered at least partially by verifying that each data transaction set corresponds to one of said financial transaction accounting systems.

8. The system according to claim 7, wherein said parsing processing server determines if said group was correctly entered at least partially by verifying that said manually totaled information agrees with information contained in said individual data transaction sets contained in said group of data transaction sets.

9. The system according to claim 8, wherein said manually totaled information includes a total monetary value of said data transaction sets.

10. The system according to claim 6, wherein said parsing processing server determines if said group was correctly entered at least partially by verifying that said manually totaled information agrees with information contained in said individual data transaction sets contained in said group of data transaction sets.

11. The system according to claim 10, wherein said manually totaled information includes a total monetary value of said data transaction sets.

12. The system according to claim 1, wherein said parsing processing server provides an indication to said user terminal that said group was correctly entered.

13. The system according to claim 12, wherein said user terminal displays an icon indicating that said group was correctly entered.

14. The system according to claim 1, wherein at least one of said transaction data sets includes electronic funds transfer data.

15. The system according to claim 14, wherein said parsing processing server communicates said electronic funds transfer data to a computer having a corresponding demand deposit account.

16. The system according to claim 1, wherein said user terminal permits said operator to sequentially enter said group of transaction data sets.

17. The system according to claim 1, further comprising a report generation computer, said report generation computer preparing at least one report based on first record data received from said parsing processing server and second record data received from at least one of said financial transaction accounting systems.

18. The system according to claim 1, wherein at least one of said financial transaction accounting systems is a check writing system.

19. The system according to claim 1, wherein at least one of said financial transaction accounting systems is an accounts payable system.

20. A processing server communicating with a user terminal and a plurality of account processors across at least one communication network, said user terminal sending respective groups of transaction data sets to said accounting processor as a respective batch, said processing server comprising:
   at least one memory having financial transaction processing software stored therein;
   at least one central processing unit executing said financial transaction processing software so as to:
      receive a batch of transaction data sets from said at least one user terminal;
      verify the accuracy of said received transaction data sets in said batch;
      determine, for each verified transaction data set in said batch, which of said plurality of account processors corresponds to said verified transaction data set; and
      for each verified transaction data set in said batch, transmitting transaction data comprising of at least a portion of said verified financial transaction data set to said corresponding account processor.

21. The server according to claim 20, wherein each of said received transaction data sets includes an account number and payment amount.

22. The server according to claim 21, wherein each of said received financial transaction data sets further includes at least one of a payment reason and a payment type.

23. The server according to claim 20, wherein said central processing unit verifies the accuracy of said received transaction data sets in said batch by comparing manually totaled information relating to said batch to information contained in said individual data transaction sets contained in said batch.

24. The server according to claim 23, wherein said manually totaled information includes a total monetary value of said data transaction sets in said batch.

25. A system for processing financial transactions, said system comprising:
   a plurality of financial transaction accounting systems;
   a first processing server;
   a user terminal permitting an operator to enter a group of transaction data sets and to send said group of transaction data sets to said first processing server, each transaction data set comprising an amount and an account number and being associated with a respective one of said financial transaction accounting systems, at least two of said transaction data sets in said group being associated with a different said financial transaction accounting system;
   said first processing server receiving said group of transaction data sets, determining if said group was correctly entered and, if so, transmitting said group as a bundle to a second processing server; and
   said second processing server sending each transaction data set in said bundle to that said financial transaction accounting system with which it is associated.

26. The system according to claim 25, wherein said second process server determines which financial transaction accounting system is associated with each respective transaction data set in said bundle.

27. A system according to claim 25, wherein said user terminal comprised web browsing software such that, in the absence of any specific financial transaction processing software installed thereon, and in accordance with programmatic instructions received by said user terminal from said first processing server, said user terminal:

allows a user of said user terminal to enter said transaction data sets;

allows a user of said user terminal to enter manually totaled information concerning the group of transaction data sets; and transmits said group of transaction data sets and said manually totaled information to said first processing server.

28. A system according to claim 27, wherein said first processing server determines if said group was correctly entered at least partially by verifying that each data transaction set corresponds to one of said financial transaction accounting systems.

29. The system according to claim 28, wherein said first processing server determines if said group was correctly entered at least partially by verifying that said manually totaled information agrees with information contained in said individual data transaction sets contained in said group of data transaction sets.

30. The system according to claim 29, wherein said manually totaled information includes a total monetary value of said transaction data sets.

31. The system according to claim 27, wherein said first processing server determines if said group was correctly entered at least partially by verifying that said manually totaled information agrees with information contained in said individual data transaction sets contained in said group of data transaction sets.

32. The system according to claim 31, wherein said manually totaled information includes a total monetary value of said transaction data sets.

33. A system for processing financial transactions comprising:

a plurality of financial transaction accounting systems;

a breakout processor;

a user terminal permitting an operator to enter transaction data sets into said breakout processor, each transaction data set comprising an account number and being associated with a respective one of said financial transaction accounting systems, at least two of said transaction data sets being associated with a different said financial transaction accounting system;

said breakout processor receiving said transaction data sets and determining, for each set, which financial accounting system said set is associated with as a function of said account number, said breakout processor sending each transaction data set to that said financial transaction accounting system with which it is associated.

34. The system according to claim 33, wherein said breakout processor receives said transaction data sets from said user terminals across a first communication network and communicates with said financial transaction accounting systems across a second network.

35. The system according to claim 33, wherein said breakout processor receives said transaction data sets from said user terminals and communicates with said financial transaction accounting systems via the same communication network.

36. The system according to claim 33, further comprising a general ledger system communicating with said breakout processor.

37. The system according to claim 36, wherein said breakout processor transmits accounting update data to said general ledger system, said accounting update data corresponding to at least a portion of said transaction data sets.

38. The system according to claim 33, wherein each said user terminal comprises web browsing software such that, in the absence of any specific financial transaction processing software installed thereon and in accordance with programmatic instructions received by said user terminal from said breakout processor, said user terminal:

allows said operator to enter a group of said transaction data sets;

allows said operator to enter manually totaled information concerning said group of said transaction data sets; and transmits said group of transaction data sets and said manually totaled information to said breakout processor.

39. The system according to claim 38, wherein said breakout processor only sends said transaction data sets to said financial transaction systems if said group was correctly entered.

40. The system according to claim 39, wherein said breakout processor determines if said group was correctly entered at least partially by verifying that each data transaction set corresponds to one of said financial transaction accounting systems.

41. The system according to claim 40, wherein said breakout processor determines if said group was correctly entered at least partially by verifying that said manually totaled information agrees with information contained in said individual data transaction sets contained in said group of data transaction sets.

42. The system according to claim 41, wherein said manually totaled information includes a total monetary value of said data transaction sets.

43. The system according to claim 39, wherein said breakout processor determines if said group was correctly entered at least partially by verifying that said manually totaled information agrees with information contained in said individual data transaction sets contained in said group of data transaction sets.

44. The system according to claim 43, wherein said manually totaled information includes a total monetary value of said data transaction sets.

45. The system according to claim 39, wherein said breakout processor provides an indication to said user terminal that said group was correctly entered.

46. The system according to claim 45, wherein said user terminal displays an icon indicating that said group was correctly entered.

47. The system according to claim 33, wherein at least one of said transaction data sets includes electronic funds transfer data.

48. The system according to claim 47, wherein said breakout processor communicates said electronic finds transfer data to an account processor having a corresponding demand deposit account.

49. The system according to claim 33, wherein said user terminal permits said operator to sequentially enter a group of said transaction data sets.

50. The system according to claim 33, further comprising a report generation computer, said report generation computer preparing at least one report based on first record data received from said breakout processor and second record data received from at least one of said financial transaction accounting systems.

51. The system according to claim 33, wherein at least one of said financial transaction accounting systems is a check writing system.

52. The system according to claim 33, wherein at least one of said financial transaction accounting systems is an accounts payable system.

53. A processing server communicating with a user terminal and a plurality of account processors across at least one communication network, said user terminal sending respective groups of transaction data sets to said processing server as respective batches, said processing server comprising:
- at least one memory having financial transaction processing software stored therein;
- at least one central processing unit executing said processing software so as to:
  - receive a batch of transaction data sets from said at least one user terminal, at least two of said transaction data sets in said batch being associated with different account processors;
  - verify the accuracy of said received transaction data sets in said batch;
  - determine, for each verified transaction data set in said batch, which of said plurality of account processors said verified transaction data set is associated with as a function of said account number; and
- for each verified transaction data set in said batch, transmitting transaction data comprising of at least a portion of said verified financial transaction data set to said associated account processor.

54. The server according to claim 53, wherein each of said received financial transaction data sets further includes at least one of a payment reason and a payment type.

55. The server according to claim 53, wherein said central processing unit verifies the accuracy of said received transaction data sets in said batch by comparing manually totaled information relating to said batch to information contained in said individual data transaction sets contained in said batch.

56. The server according to claim 55, wherein said manually totaled information includes a total monetary value of said data transaction sets in said batch.

57. A system for processing financial transactions, said system comprising:
- a plurality of financial transaction accounting systems;
- a first processing server;
- a user terminal permitting an operator to enter a group of transaction data sets and to send said group of transaction data sets to said first processing server, each transaction data set comprising an account number and being associated with a respective one of said financial transaction accounting systems, at least two of said transaction data sets in said group being associated with a different said financial transaction accounting system;
- said first processing server receiving said group of transaction data sets, determining if said group was correctly entered and, if so, transmitting said group as a group of transaction date sets to a second processing server; and
- said second processing server determining for each transaction set in said group of transaction data sets, which financial transaction accounting system said set is associated with and sending each transaction data set in said group of transaction data sets to that said financial transaction accounting system with which it is associated.

58. A system according to claim 57, wherein said user terminal comprises web browsing software such that, in the absence of any specific financial transaction processing software installed thereon, and in accordance wish programmatic instructions received by said user terminal from said first processing server, said user terminal:
- allows a user of said user terminal to enter said group of transaction data sets;
- allows a user of said user terminal to enter manually totaled information concerning said group of transaction data sets; and
- transmits said group of transaction data sets and said manually totaled information to said first processing server.

59. A system according to claim 58, wherein said first processing server determines if said group was correctly entered at least partially by verifying that each data transaction set corresponds to one of said financial transaction accounting systems.

60. The system according to claim 59, wherein said first processing server determines if said group was correctly entered at least partially by verifying that said manually totaled information agrees with information contained in said individual data transaction sets contained in said group of data transaction sets.

61. The system according to claim 60, wherein said manually totaled information includes a total monetary value of said transaction data sets.

62. The system according to claim 58, wherein said first processing server determines if said group was correctly entered at least partially by verifying that said manually totaled information agrees with information contained in said individual data transaction sets contained in said group of data transaction sets.

63. The system according to claim 62, wherein said manually totaled information includes a total monetary value of said transaction data sets.

64. The system according to claim 57, wherein said second processing server determines which financial transaction accounting system each of said transaction data sets is associated with as a function of said account number.

65. A system for processing financial transactions, said system comprising:
- a plurality of financial transaction accounting systems;
- a breakout processor;
- a user terminal permitting an operator to enter transaction data sets into said breakout processor, each transaction data set comprising information concerning a payment made by a customer in connection with an associated one of said financial transaction accounting systems, and including information unique to said customer, at least two of said transaction data sets being associated with different said financial transaction accounting systems;
- said breakout processor receiving said transaction data sets, determining, for each set, which financial transaction system said set is associated with as a function of said information which is unique to said customer and sending each transaction set to that said financial transaction accounting system with which it is associated.

66. The system of claim 65, wherein said unique information is an account number.

67. The system according to claim 66, wherein said breakout processor receives said transaction data sets from said user terminal across a first communication network and communicates with said financial transaction accounting system across a second network.

68. The system according to claim 66, wherein said breakout processor receives said transaction data sets from said user terminal and communicates with said financial transaction accounting system via the same communication network.

69. The system according to claim 66, further comprising a general ledger system communicating with said breakout processor.

70. The system according to claim 69, wherein said breakout processor transmits accounting update data to said general ledger system, said accounting update data corresponding to at least a portion of said transaction data sets.

71. The system according to claim 66, wherein said user terminal comprises web browsing software such that, in the absence of any specific financial transaction processing software installed thereon and in accordance with programmatic instructions received by said user terminal from said breakout processor, said user terminal:
   allows said operator to enter a group of said transaction data sets;
   allows said operator to enter manually totaled information concerning said group of said transaction data sets; and
   transmits said group of transaction data sets and said manually totaled information to said breakout processor.

72. The system according to claim 71, wherein said breakout processor only sends said transaction data sets to said financial transaction systems if said group was correctly entered.

73. The system according to claim 72, wherein said breakout processor determines if said group was correctly entered at least partially by verifying that each data transaction set corresponds to one of said financial transaction accounting systems.

74. The system according to claim 73, wherein said breakout processor determines if said group was correctly entered at least partially by verifying that said manually totaled information agrees with information contained in said individual data transaction sets contained in said group of data transaction sets.

75. The system according to claim 74, wherein said manually totaled information includes a total monetary value of said data transaction sets.

76. The system according to claim 72, wherein said breakout processor determines if said group was correctly entered at least partially by verifying that said manually totaled information agrees with information contained in said individual data transaction sets contained in said group of data transaction sets.

77. The system according to claim 76, wherein said manually totaled information includes a total monetary value of said data transaction sets.

78. The system according to claim 72, wherein said breakout processor provides an indication to said user terminal that said soup was correctly entered.

79. The system according to claim 78, wherein said user terminal displays an icon indicating that said group was correctly entered.

80. The system according to claim 66, wherein at least one of said transaction data sets includes electronic funds transfer data.

81. The system according to claim 80, wherein said breakout processor communicates said electronic funds transfer data to a financial transaction accounting system having a corresponding demand deposit account.

82. The system according to claim 66, wherein said user terminal permits said operator to sequentially enter a group of said transaction data sets.

83. The system according to claim 66, further comprising a report generation computer, said report generation computer preparing at least one report based on first record data received from said breakout processor and second record data received from at least one of said financial transaction accounting systems.

84. The system according to claim 66, wherein at least one of said financial transaction accounting systems is a check writing system.

85. The system according to claim 66, wherein at least one of said financial transaction accounting systems is an accounts payable system.

86. A method for processing financial transactions in a financial processing system which includes a plurality of financial transaction accounting systems, a breakout server, and a user terminal permitting an operator to enter transaction data sets into said breakout server, each transaction data set being indicative of a respective financial transaction, each financial transaction being associated with a respective customer and a respective one of said financial transaction accounting systems, said process comprising, entering a group of transaction data sets using said user terminal, at least two of said financial transaction data sets in said group being associated with different ones of said financial transaction accounting systems, each said financial transaction data sets including information which is unique to said respective customer, said method comprising:
   determining in said breakout server, for each of said financial transaction data sets in said group, which of said financial transaction accounting systems said financial transaction data set is associated with as a function of said unique information; and
   forwarding each of said financial transaction data sets in said group to that respective financial transaction accounting system said financial date set is associated with.

87. The method of claim 86, wherein said unique information is a respective account number associated with each said financial transaction.

88. The method of claim 86, further including entering manually totaled information concerning said group of transaction data sets and wherein said financial transaction data sets in said group are forwarded to their respective financial transaction accounting systems when the manually entered total agrees with a corresponding total determined by said breakout server.

89. The method of claim 87, wherein each of the transaction data sets includes a monetary amount and said manually entered total represents the total monetary amount of said transaction data sets.

* * * * *